US007922853B2

(12) United States Patent
Edelmann et al.

(10) Patent No.: US 7,922,853 B2
(45) Date of Patent: Apr. 12, 2011

(54) PROCESS FOR THE PRODUCTION OF A COMPONENT, AND FIBRE-REINFORCED THERMOPLASTIC COMPONENT

(75) Inventors: Klaus Edelmann, Bremen (DE); Tanja Frese, Horstedt (DE); Timo Stoeven, Bremen (DE); Tobias Wirtz, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 12/693,794

(22) Filed: Jan. 26, 2010

(65) Prior Publication Data

US 2010/0186882 A1    Jul. 29, 2010

Related U.S. Application Data

(63) Continuation of application No. PCT/EP2008/058481, filed on Jul. 2, 2008.

(60) Provisional application No. 60/964,170, filed on Aug. 9, 2007.

(30) Foreign Application Priority Data

Aug. 9, 2007   (DE) .......................... 10 2007 037 649

(51) Int. Cl.
*B29C 53/06*       (2006.01)
(52) U.S. Cl. ........ 156/217; 156/245; 156/189; 156/166; 264/257; 264/258; 264/266; 264/320; 264/294
(58) Field of Classification Search .................. 156/189, 156/297, 166, 167, 168, 172, 173, 184, 192, 156/245, 217; 264/152, 160, 257, 258, 266, 264/320, 324, 325, 294
See application file for complete search history.

(56) References Cited

U.S. PATENT DOCUMENTS

| 5,238,725 A | 8/1993 | Effing et al. |
| 5,431,870 A | 7/1995 | André |
| 5,874,151 A * | 2/1999 | Cohee et al. .................. 428/102 |

(Continued)

FOREIGN PATENT DOCUMENTS

DE            69125031 T2       7/1997

(Continued)

OTHER PUBLICATIONS

German Office Action for DE 10 2007 037 649 dated Dec. 10, 2007.

(Continued)

*Primary Examiner* — Khanh Nguyen
*Assistant Examiner* — Keith T Aziz
(74) *Attorney, Agent, or Firm* — Jenkins, Wilson, Taylor & Hunt, P.A.

(57)    ABSTRACT

The invention relates to a method for producing a component for connecting a fuselage cell skin to an annular rib of an aircraft, wherein the component is formed by bending of a flat blank along at last two edge lines and wherein the blank is formed by a CFRP.

According to the invention the interlaminar sliding of the fiber layers is largely completed in a first forming step, while in a second forming step a consolidation of the component takes place by the use of pressure from the press on all sides by means of an upper tool and a lower tool. This enables complex components with at least two edge lines to be produced, which edge lines run at angles of approximately, preferably at angles of 309° to 90°, to each other, and which edge lines also lie in at least two different planes.

1 Claim, 3 Drawing Sheets

U.S. PATENT DOCUMENTS

| | | |
|---|---|---|
| 6,553,734 B1 * | 4/2003 | McKague et al. ............ 52/309.1 |
| 6,613,258 B1 | 9/2003 | Maison et al. |
| 7,208,220 B2 * | 4/2007 | Yamasaki et al. .......... 428/296.4 |
| 2005/0127566 A1 | 6/2005 | Chotard |
| 2009/0115097 A1 * | 5/2009 | de Groot ....................... 264/250 |

FOREIGN PATENT DOCUMENTS

| | | |
|---|---|---|
| DE | 60 2004 001 569 T2 | 7/2007 |
| EP | 0603066 | 6/1994 |
| EP | 1145829 A | 10/2001 |
| GB | 841 371 A | 7/1960 |

OTHER PUBLICATIONS

International Search Report and Written Opinion for PCT/EP2008/058481 dated Oct. 17, 2008.

* cited by examiner

PROCESS FOR THE PRODUCTION OF A COMPONENT, AND FIBRE-REINFORCED THERMOPLASTIC COMPONENT

CROSS-REFERENCE TO RELATED APPLICATIONS

This application is a continuation of PCT International Application No. PCT/EP2008/058481 filed Jul. 2, 2008, which claims the benefit of U.S. Provisional Application No. 60/964,170, filed Aug. 9, 2007 and German Patent Application No. 10 2007 037 649.0, filed Aug. 9, 2007, the entire disclosures of which are herein incorporated by reference.

FIELD OF THE INVENTION

The invention relates to a method for producing a component, in particular an angle, for connecting a fuselage cell skin to an annular rib of an aircraft, where the component is to be formed by bending a flat blank several times along at least two edge lines, and where the blank is formed with a thermoplastic plastic reinforced with several layers of fibres.

The invention also relates to a component of a thermoplastic plastic reinforced with a multiplicity of fibre layers, the component formed by bending, particularly according to the method of the invention.

The fuselage cell of an aircraft, in the aluminium section design still in widespread use, is generally produced from a multiplicity of fuselage sections arranged one behind the other and connected by circumferential transverse seams, which sections are each formed with at least two shell segments. To save weight the fuselage sections are increasingly being produced with composite materials, in particular with carbon fibre reinforced plastics (CFP's). In this design a CFP fuselage cell skin is stiffened on the inside with annular ribs, which are also formed with CFP profiles. In parallel with the longitudinal extension of the fuselage section CFP longitudinal stiffening profiles ("stringer profiles") are arranged distributed uniformly on an inner surface of the fuselage cell skin beyond the circumference. The stringer profiles are preferably formed at the same time as the production of the CFP fuselage cell skin. The connection is made between the annular ribs and the fuselage cell skin with angles (so-called "clips"). These angles have essentially one leg for bearing against the annular rib and a further leg for bearing against the fuselage cell skin. The connection of the angles to the annular rib and the fuselage cell skin can optionally be made by gluing, riveting, screwing, welding or a combination of these.

To avoid corrosion problems in the area of contact with the composite material and further reduce the weight, the angles are also produced with a fibre reinforced plastic material instead of from being sheet aluminium plates. Since the production of the angles with carbon fibre reinforced duroplastic plastics required in a very large quantity (over 100,000 pieces per aircraft) is too time-consuming, plate-shaped semi-finished products (so-called "organoplates"), formed with carbon fibre reinforced thermoplastics, are used.

When such plate-shaped, fibre reinforced thermoplastic plastics are formed, production (shaping and consolidation) of the component in a single forming stage is required, unlike in conventional metal plate forming. Here the entire blank is first heated and transferred to a forming tool after the melting temperature is exceeded, and formed and consolidated into the finished component by means of an upper tool positioned in a press. Only forming operations in which the linear closing movement of the upper tool towards a lower tool ensures that the plasticised thermoplastic material is brought into the desired position can be achieved with a single axis press. The component design is greatly restricted by this condition. A design specification is required for the component, for example several conseblankive forming steps—such as those achievable without problem in the case of sheet aluminium forming, this has so far been impracticable in the case of the "organo" plates because the entire component must always be fully melted, i.e. plasticised and is again fully consolidated during the subsequent shaping process (pressing), i.e. all workpiece surfaces have to be subjected to a sufficiently high pressure.

Consideration must also be given to the fact that when "organo" plates are formed so-called "interlaminary slide" necessarily takes place, i.e. the fibre layers coated one above the other in the carbon fibre reinforced thermoplastic plate are displaced due to the edge radii, which are different on the inside and outside, relative to each other. This may result in impairment of the process and integrity of the fibre reinforcement during forming.

In the production of complex parts by bending and forming of "organo" plates, the procedure, sufficiently known from sheet aluminium forming, cannot be applied to multiple bends.

SUMMARY OF THE INVENTION

The object of the invention is therefore to develop the forming technique known from sheet aluminium forming to the extent that complex three-dimensional, one-piece components can be produced by bending from flat blanks of a fibre reinforced thermoplastic plastic material ("organo" plate).

This object is achieved by a method with the features of claim 1.

Because the blank is formed into a preform the subsequent shaping of the preform to produce the component takes place in a second forming step, interlaminary slide is completed before the second forming step since this has already taken place in the first forming step between the individual fibre layers. This enables components can be produced from fibre reinforced thermoplastics with a complex geometry by forming and bending. According to the method at least one further plane, forming at least one edge line, is generated from a flat blank (first plane) to produce a preform, and further planes can be produced by renewed bending from this plane, without impairing the fibre process and/or the fibre integrity in the perform, further edge lines of which planes are able to run at angles of 0° to 90°—i.e. not necessarily parallel—relative to the first edge line. Contrary to this, the edge lines had to lie in one plane or run parallel to each other in the prior art.

To carry out this method a flat blank is cut from a flat plate of a thermoplastic reinforced with a multiplicity of fibre layers ("organo" plate). The fibre layers may be formed with plastic fibres, glass fibres, Aramide®$^{fibres}$, Kevlar® fibres, basalt fibres, natural fibres or the like, which are embedded in the thermoplastic matrix one above the other in the manner of a fabric. Alternatively the fibre layers may be constructed with fibre fabrics, fibre knitted fibre fabrics or discrete rovings.

The blank is then heated above the melting temperature range of the plastic and formed or draped into a preform in a first forming step after ideally complete termination of interlaminary side. Here the individual layers slide onto each other within the reinforcing fibre arrangement. The term "draping" in this context means the essentially fold-free forming of an initially still flat, fibre reinforced structure into a spatial structure.

After the preform is cooled it is again plasticised in a further method step, positioning fixing of the preform generally being required in order to prevent undefined displacement back into the flat condition. If the preform is used, for example, to produce an angle, the position of the preformed leg may be fixed by means of a clamp whose outer shape approaches that of a conventional necktie clamp, for example. When the preform has reached the required forming temperature, which is generally slightly above the melting temperature of the thermoplastic used, the preform is transferred to a press with an upper tool and a lower tool. In this second forming step the final shaping takes place because of the compression of the press. This is the so-called consolidation of the component due to the pressure that is applied ideally uniformly on all sides. The upper and lower tools inside the pressure can, if necessary, be provided with additional heating devices. If the cycle times in producing the preform and those of the pressing process are sufficiently short, both forming steps can be combined so that single heating of the blank is sufficient.

It is decisive for the method according to the invention that the interlaminar sliding of the fibre layers that necessarily take place is already largely terminated and that only the final geometric shaping and consolidation takes place during the second forming step by the application of pressure in the pressing tools, which should ideally be on all sides and acting with the same force. To produce complex component geometries one plane is no longer successively formed in the inventive method from a previously bent plan by renewed bending after renewed plasticisation, but all the component planes required for the design are applied almost "latently" when producing the preform in the first method step. According to the method according to the invention the sliding of the fibre layers always takes place essentially perpendicularly to the edge line concerned, so that no strength-reducing impairments (e.g. distortions, displacements) in the fibre reinforcement result from the forming operations.

Because of the interlaminar sliding there is undeniable stocking, i.e. obliquely running component edges of the components manufactured according to the invention. This stocking is removed, separated or ground off by generally mechanical remachining of the component edges in order to achieve the specified component contour.

To produce the component according to the method thermoplastics are preferably used, e.g. PPS, PEEC, PECC or any combination thereof, preferably reinforced with several layers of carbon fibres.

The object of the invention is additionally achieved by a component described herein.

Because the component has at least two edge lines running at an angle of approx. 0° to 90° to each other, and the edge lines lie in at least two different planes, the component meets a multiplicity of design requirements in the case of a simultaneously force-flow-orientated course of the reinforcing fibres, and can therefore be used in large quantities, for example, for connecting the CFP annular ribs to a CFP outer fuselage skin of an aircraft. The component also has very low weight with a simultaneous high static and dynamic loading capacity, and can also be produced economically in large quantities with close component tolerances.

Further advantageous embodiments of the method and of the component are explained in the further claims.

DESCRIPTION OF EXEMPLARY EMBODIMENTS

Figure 1:
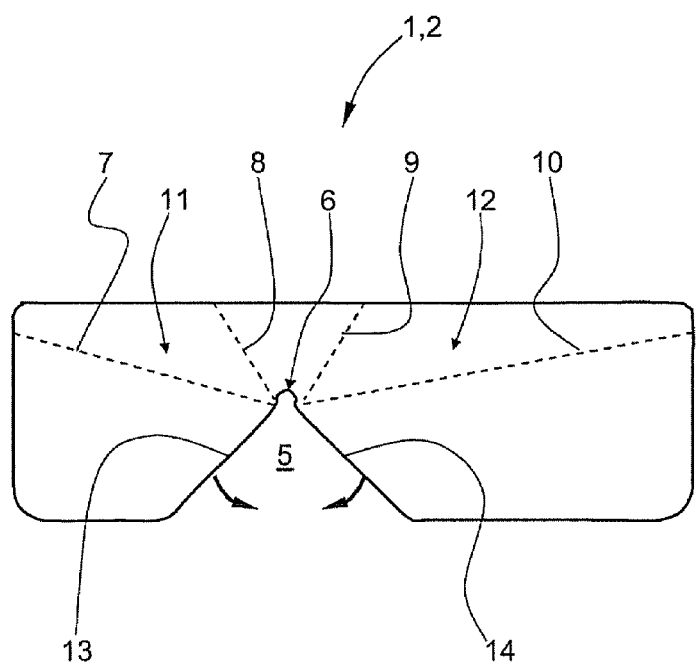
FIG. 1 shows a diagrammatic representation of the flat, single-piece blank, still with "soft edge lines" (pre-formed edge lines) for producing the preform.

In the drawing the same structural elements each have the same reference number. From now on in the description reference is initially made to FIGS. 1 to 4 simultaneously.

FIG. 1 shows an elevation of a blank 1, which is initially still flat and which serves as a preliminary stage for producing preform 2 and finished component 3 by means of several bending operations. Finished component 3 is a (connecting) angle 4 or a gusset plate for the interior fastening of annular ribs to a fuselage cell skin of an aircraft in the exemplary embodiment shown. Blank 1 is preferably formed with a thermoplastic material reinforced with several fibre layers, particularly carbon fibre layers. PPS, PEEC, PECC in particular, or any combination thereof, are considered as suitable thermoplastic material.

The single-piece blank 1 has an essentially V-shaped cut-out 5 whose tip is able to run into an approximately circular recess 6 for stress relief of section 5. Edge lines 7 to 10, shown as dotted lines, define so-called "soft" curvature regions 11, 12, in which curvatures of blank 1 are essentially produced during the creation of preform 2 in the first forming step. The "soft" edge lines 7 to 10 limit curvature regions 11, 12, in which forming can be carried out. The "soft" edge lines therefore form "pre-established", latent edge lines that have not yet attained their final shape, between which the final "sharp" edge lines are produced during the consolidation in the second forming step. The two black arrows in FIG. 1 illustrate the direction of movement of edges 13, 14 of V-shaped section 5 during the transition from the condition shown in FIG. 1 to the status shown in FIG. 2. The transformation or draping of single-piece blank 1 into preform 2 during the first forming step takes place within the range of the plasticisation temperature of blank 1, which generally lies within the range of the melting temperature of the thermoplastic used. It is also necessary to heat preform 2 to within the melting temperature range of the thermoplastic used in order to complete the second forming step.

Figure 2:
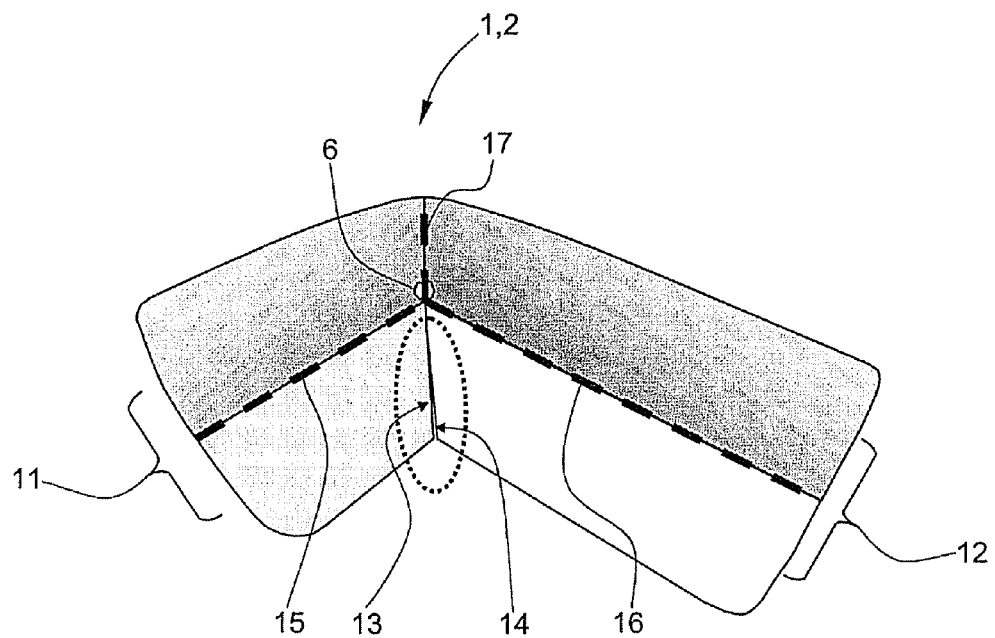
FIG. 2 shows a perspective view of the draped preform with a position-fixed region after the first forming step.

In the perspective representation shown in FIG. 2, preform 2 has attained its geometric shape required for the second forming step, i.e. the first forming step of the method according to the invention is complete. It is of decisive importance that individual parallel fibre layers stop sliding over one another, ideally almost completely, in this method stage. Consequently no further folding, warping or delaminations take place in preform 2 during the subsequent second forming step, and neither the integrity nor the direction of running of the fibre layers is impaired, with the result that finished component 3 attains a very high static and dynamic mechanical loading capacity.

Mechanical position fixing of edges 13, 14 that may be required in the course of the renewed hearing for the second final forming step is represented symbolically by the dotted ellipse. This prevents uncontrolled re-deformation of preform into the flat shape of blank 1 during reheating. Bending of preform 2 in the second forming step during consolidation takes place essentially only along final edge lines 15 to 17, which embody the final section of the bending operations. It can be clearly seen that the three final edge lines 15 to 17 run perpendicularly to each other.

Figure 3:
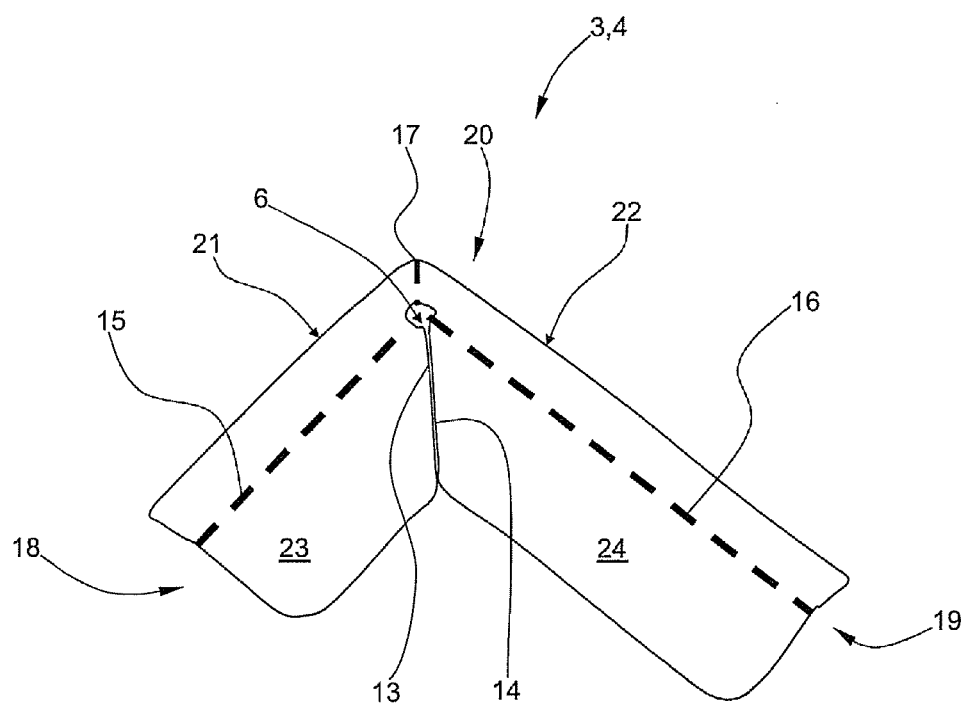
FIG. 3 shows an elevation of the preform after the completion of the second forming step.
Figure 4:
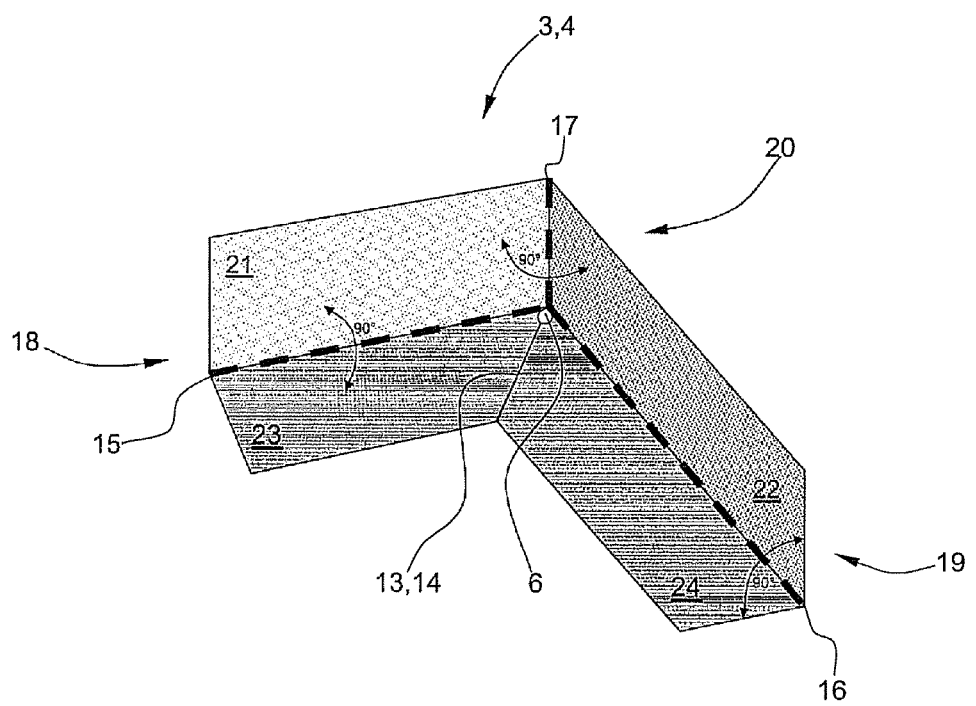
FIG. 4 shows a perspective view of an exemplary component (angle or connecting angle) after completion of the second forming step in the end condition.

FIGS. 3 and 4 show preform 2 already formed into finished component 3 or angle 4 in an elevation and in a perspective view respectively. Angle 4 has the three final edge lines 15 to 17 bearing orthogonally against each other, which lines are in the end produced during the final forming or during the consolidation of preform 2 in the second method step. Edge lines 15 and 16 generally run between the two curvature regions 11, 12 clamped by the "soft" edge lines 7, 8 and 9, 10.

In FIGS. 3, 4 the consolidation of preform 2 is fully completed in the course of the second forming step of the method, i.e. component 3 or angle 4 has essentially the final geometric shape. To carry out the second forming step preform 2 is first again brought to a temperature exceeding the melting temperature of the thermoplastic, position fixing by suitable clamping mechanisms or the like being required. Preform 2 is then transferred to a pressure with an upper tool and a lower tool, the preform being placed on the lower tool. The final shaping of preform 2, located between the upper and lower tool, and its consolidation by the press pressure take place as a result of the compression of the press. Where the cycle times of the first and second forming step are very short, renewed heating of the preform before the second forming step is essential. Finished component 3 or angle 4 in the exemplary embodiment show always displays stocking in the edge region due to the interlaminary displacements of the fibre layers. The oblique component edges are mechanically remachined for final use of component 3 in order to achieve the final component contour.

Angle 4 has two legs 18, 19 which are connected essentially perpendicularly to each other. Angle 4 also has a continuous back face 20, which is formed by two planes 21, 22 essentially perpendicularly adjacent to each other (contact surfaces of angle 4). Two further planes 23, 24 (base surfaces of angle 4) connect to planes 21, 22 in the downward direction, also at an angle of approximately 90°. Both planes 21, 22 and planes 23, 24 can, if necessary, be shaped so that they are covered in one or two directions of the space. Planes 23, 24 lie approximately parallel to each other along edges 13, 14. Alternatively it is also possible for edges 13, 14 to run parallel to each other at a certain distance, for example. According to a design variant not shown, edges 13, 14 can also be melted or glued solidly together during the consolidation process in order to increase the strength of angle 4 still further. The interface between different components of an aircraft is formed by means of angle 4 in planes 21, 22 and planes 23, 24, for example an interior connection of an annular rib to a fuselage cell skin.

Figure 5:
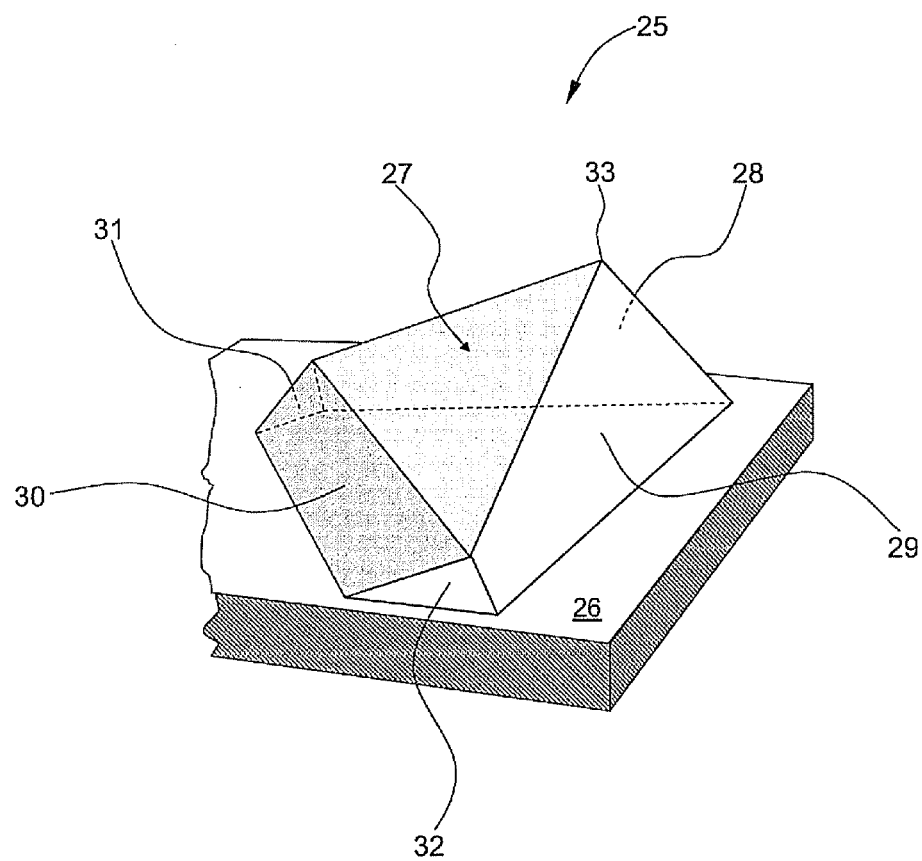
FIG. 5 shows a perspective view of a lower tool used for the consolidation of final shaping of the preform in a press.

FIG. 5 shows a lower tool 25 in a press not shown, which tool is used for consolidating preform 2 in the second forming step. Lower tool 25 has the shape of a irregular polyhedron and is arranged on a base plate 26 which is inserted in a press. Lower tool 25 has a total of six flat surfaces 27 to 32. Upper surface 27 is an isosceles triangle, whereas the two rear, smaller lateral surfaces 31, 32 have the form of an irregular or right-angled triangle. The two large front lateral surfaces 28, 29 have the geometric shape of an irregular square, whilst the rear lateral surface 30 is trapezoidal. All surfaces 27 to 32 are designed inclined to base plate 26. The contour of lower tool 25 corresponds to an irregular pentagon.

For the final consolidation of preform 2 sufficiently plasticised by the effect of heat it is then placed on lower tool 25 so that circular recess 6 lies in the region of a tool tip 33, the base surfaces 23, 24 subsequently bent bear at least in certain regions against the large lateral surfaces 27, 29.

The upper tool not shown in the representation in FIG. 5, and lower tool 25, are compressed by means of a press in order to consolidate preform 2 located between them and give it its final predetermined geometric shape. The upper tool is designed to correspond to lower tool 25, i.e. a positive connection can be made between upper and lower tool 25, at least in certain regions. A cavity produced between upper and lower tool 25 is in this case preferably dimensioned so that a uniform contact pressure is set throughout the surface of the preform during compression of the tools. Upper and/or lower tool 25 can be equipped with a heating device for tempering. Alternatively the consolidation of the preform can be carried out with a tool which is guided with at least one handling device, in particular with a standard articulated arm robot with several degrees of freedom (industrial robot). To simplify the geometric shape of the tool the bevelled surfaces 31, 32 may be dispensed with so that lower tool 25 and the correspondingly designed upper tool have a triangular contour.

After finished component 3 is removed from the mould in the shape of angle 4, and after a subsequent cooling phase, if necessary, the stocking in the edge region is mechanically remachined to create the final component contour.

Figure 6:
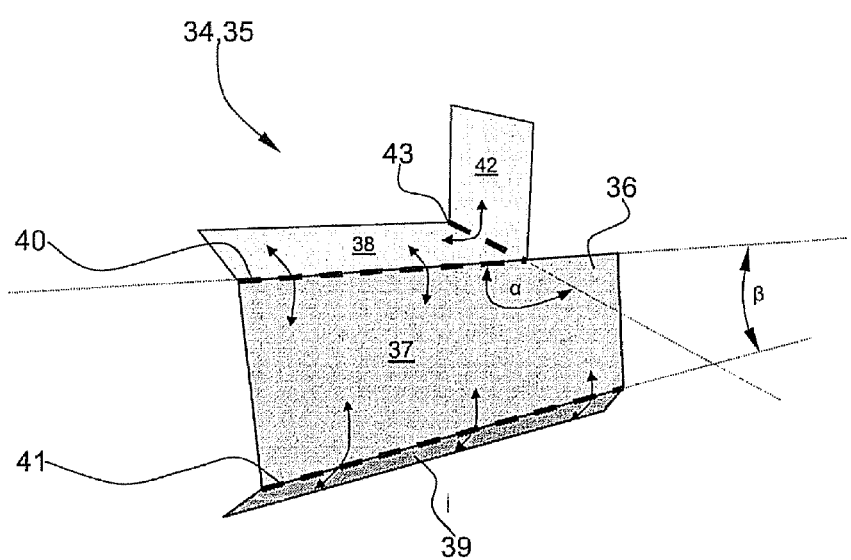
FIG. 6 shows an alternative preform for producing a further component with a complex geometric shape.

FIG. 6 shows a perspective view of a further preform for producing a component 35 (angle) with a complex geometry, preform 34 being formed with a blank 36 from the "organo" plate by bending. Preform 34 is consolidated to produce the final shaping in a suitable tool, i.e. it is loaded on all sides with a press pressure acting as uniformly as possible.

A second and third plane 38, 39 generated by forming and bending connect to blank 36, which is still flat and which represents a first (base) plane 37. Edge lines 40, 41 thus produced run in the exemplary embodiment at an angle β of approximately 10° to each other and both lie in plane 37. In principle angles β from 0° to 90° are also possible. A further (fourth) plane 42 connects perpendicularly second plane 38 at right angles in an upward direction with the formation of a third edge line 43. Third edge line 43 lines in fourth plane 42, which is different from the first and second plane 37, 38, and also forms, with edge line 40, which lies in first plane 37, an angle α of approximately 90°. Third edge line 43 may, in a bending operation carried out differently, also run at an angle α between 0° and 90°, preferably at angle of between 309° and 90°.

Preform 34 therefore finally has three edge lines 40, 41, 43, each of which runs at angles of between 09° and 90° to each other.

The directions of sliding of the reinforcing fibre layers in blank 36 are indicated by black arrows not provided with a reference number. It can be seen that the directions of sliding of the fibre layers each run approximately perpendicularly to the associated edge line 40, 41, 43. During this process flat blank 36 is brought to and maintained at a temperature which is slightly above the melting temperature of the "organo" plate.

Because of the forming process according to the invention it is guaranteed that the interlaminary sliding takes place essentially in only one direction, so that there is no impairment in the fibre orientation and/or fibre integrity and no folding (corrugation) and delaminations due to this (generation of planes 38, 39 with the two edge lines 40, 41 from the first (base) plane 37, and generation of fourth plane 42 from plane 38 with the formation of edge line 43).

After the bending processes the interlaminary sliding is largely completed and preform 34 can be consolidated in a final second forming step in order to obtain the final geometric shape by the application of pressure and temperature.

The method according to the invention, in addition to angle 4 described by way of example and component 35, is suitable for creating components of all kinds with a complex geometric shape with fibre reinforced thermoplastics by forming by means of bending.

LIST OF REFERENCE NUMERALS

1 Blank
2 Preform
3 Component (finished)
4 Angle (finished)
5 Section
6 Circular recess
7 Edge line (soft)
8 Edge line (soft)
9 Edge line (soft)
10 Edge line (soft)
11 Curvature region
12 Curvature region
13 Edge
14 Edge
15 Edge line (final)
16 Edge line (final)
17 Edge line (final)
18 Leg (angle)
19 Leg (angle)
20 Back face (angle)
21 Plane (contact surface of angle)
22 Plane (contact surface of angle)
23 Plane (base surface of angle)
24 Plane (base surface of angle)
25 Lower tool
26 Base plate
27 Surface (upper)
28 Surface (front large lateral surface)
29 Surface (front large lateral surface)
30 Surface (rear lateral surface)
31 Surface (rear small lateral surface)
32 Surface (rear small lateral surface)
33 Tool tip
34 Preform
35 Component (angle)
36 Flat blank
37 (First) plane
38 (Second) plane
39 (Third) plane
40 Edge line
41 Edge line
42 (Fourth) plane
43 Edge line

The invention claimed is:

1. A method of producing a component with the following steps:
    a) preparing a blank which has a thermoplastic material, reinforced with several fibre layers, wherein the blank has an essentially V-shaped cut-out whose tip coincides with a point of intersection of three predetermined edge lines of the blank and has an approximately circular recess;
    b) shaping the blank along the predetermined edge lines, largely with termination of a slide of the fibre layers, to form a preform comprising preform edge lines which run approximately perpendicularly to each other;
    c) placing the preform on an upper or lower tool of a press, such that the preform has a pyramid shape with a base surface and three lateral surfaces, which together form a preform tip, so that the approximately circular recess of the preform rests in the region of the preform tip so that the base surfaces of the preform assigned to the V-shaped section of the preform bear against one of the lateral surfaces at least partially;
    d) compressing the preform in the press to form the final edge lines and consolidation of the preform and hence formation of the component.

* * * * *